US012783281B2

(12) United States Patent
Raja

(10) Patent No.: US 12,783,281 B2
(45) Date of Patent: Nov. 3, 2026

(54) MEMORY SYNCHRONISATION SUBSEQUENT TO A MAINTENANCE OPERATION

(71) Applicant: Arm Limited, Cambridge (GB)

(72) Inventor: Abhishek Raja, Niagara Falls, NY (US)

(73) Assignee: Arm Limited, Cambridge (GB)

( * ) Notice: Subject to any disclaimer, the term of this patent is extended or adjusted under 35 U.S.C. 154(b) by 547 days.

(21) Appl. No.: 18/452,622

(22) Filed: Aug. 21, 2023

(65) Prior Publication Data

US 2025/0068449 A1 Feb. 27, 2025

(51) Int. Cl.
*G06F 9/455* (2018.01)

(52) U.S. Cl.
CPC .................... *G06F 9/45558* (2013.01); *G06F 2009/45583* (2013.01)

(58) Field of Classification Search
CPC ....... G06F 9/45558; G06F 2009/45583; G06F 11/1658; G06F 9/30094; G06F 11/1666; G06F 11/1675; G06F 12/1036; G06F 2009/45562; G06F 2009/45587; G06F 2009/45591
See application file for complete search history.

(56) References Cited

U.S. PATENT DOCUMENTS

| | | | | |
|---|---|---|---|---|
| 10,719,453 | B1 * | 7/2020 | Abhishek Raja ... | G06F 12/0802 |
| 11,748,267 | B1 * | 9/2023 | Williams ............ | G06F 12/0891 711/135 |
| 2016/0139922 | A1 * | 5/2016 | Craske ................ | G06F 9/30087 712/228 |
| 2017/0039554 | A1 * | 2/2017 | Greifeneder ......... | G06Q 20/389 |
| 2019/0294551 | A1 * | 9/2019 | Abhishek Raja ... | G06F 12/1027 |
| 2021/0026568 | A1 * | 1/2021 | Swaine ................. | G06F 3/0673 |

* cited by examiner

*Primary Examiner* — Dong U Kim
(74) *Attorney, Agent, or Firm* — NIXON & VANDERHYE P.C.

(57) ABSTRACT

There is provided an apparatus, system, method, and medium. The apparatus comprises one or more processing elements, each processing element comprising processing circuitry to perform processing operations in one of a plurality of processing contexts. Each processing element further comprises context tracking circuitry to store context tracking data indicative of active contexts. Each processing element comprises control circuitry responsive to a request for a memory synchronisation occurring subsequent to at least one maintenance operation associated with a given set of one or more contexts of the plurality of processing contexts, to determine whether the at least one of the given set of one or more contexts is indicated in the context tracking data. The control circuitry is configured, when the at least one of the given set of one or more contexts is determined to be indicated in the context tracking data, to implement a delay before performing the memory synchronisation, and when each of the given set of one or more contexts is determined to be absent from the context tracking data, to perform the memory synchronisation without implementing the delay.

20 Claims, 11 Drawing Sheets

MEMORY SYNCHRONISATION SUBSEQUENT TO A MAINTENANCE OPERATION

TECHNICAL FIELD

The present invention relates to data processing. More particularly the present invention relates to an apparatus, a system, a chip containing product, a method, and a medium.

BACKGROUND

Some data processing apparatuses are able to perform processing operations in a plurality of processing contexts. In such apparatuses, synchronisation of memory subsequent to one or more maintenance operations can be consuming in terms of both time and resources.

SUMMARY

In a first example configuration there is provided an apparatus comprising one or more processing elements, each processing element of the one or more processing elements comprising:

- processing circuitry configured to perform processing operations, wherein the processing operations are carried out in one of a plurality of processing contexts;
- context tracking circuitry configured to store context tracking data indicative of active contexts of the plurality of processing contexts in which the processing operations have been carried out by the processing circuitry; and
- control circuitry responsive to a request for a memory synchronisation occurring subsequent to at least one maintenance operation, the at least one maintenance operation associated with a given set of one or more contexts of the plurality of processing contexts, to determine whether at least one of the given set of one or more contexts is indicated in the context tracking data, and in response to the determination:
  - when the at least one of the given set of one or more contexts is determined to be indicated in the context tracking data, to implement a delay before performing the memory synchronisation, the delay continuing until one or more pending memory updates have been performed; and
  - when each of the given set of one or more contexts is determined to be absent from the context tracking data, to perform the memory synchronisation without implementing the delay.

In a second example configuration there is provided a system comprising:

- the apparatus according to the first example configuration, implemented in at least one packaged chip;
- at least one system component; and
- a board,
- wherein the at least one packaged chip and the at least one system component are assembled on the board.

In a third example configuration there is provided a chip-containing product comprising the system of the second example configuration assembled on a further board with at least one other product component.

In a fourth example configuration there is provided a method of operating an apparatus comprising one or more processing elements, the method comprising with the one or more processing elements:

- performing, with processing circuitry, processing operations, wherein the processing operations are carried out in one of a plurality of processing contexts;
- storing context tracking data indicative of active contexts of the plurality of processing contexts in which the processing operations have been carried out by the processing circuitry; and
- in response to a request for a memory synchronisation occurring subsequent to at least one maintenance operation, the at least one maintenance operation associated with a given set of one or more contexts of the plurality of processing contexts, determining whether at least one of the given set of one or more contexts is indicated in the context tracking data, and in response to the determination:
  - when the at least one of the given set of one or more contexts is determined to be indicated in the context tracking data, implementing a delay before performing the memory synchronisation, the delay continuing until one or more pending memory updates have been performed; and
  - when each of the given set of one or more contexts is determined to be absent from the context tracking data, performing the memory synchronisation without implementing the delay.

In a further example configuration there is provided a non-transitory computer readable storage medium to store computer-readable code for fabrication of an apparatus comprising one or more processing elements, each processing element of the one or more processing elements comprising:

- processing circuitry configured to perform processing operations, wherein the processing operations are carried out in one of a plurality of processing contexts;
- context tracking circuitry configured to store context tracking data indicative of active contexts of the plurality of processing contexts in which the processing operations have been carried out by the processing circuitry; and
- control circuitry responsive to a request for a memory synchronisation occurring subsequent to at least one maintenance operation, the at least one maintenance operation associated with a given set of one or more contexts of the plurality of processing contexts, to determine whether at least one of the given set of one or more contexts is indicated in the context tracking data, and in response to the determination:
  - when the at least one of the given set of one or more contexts is determined to be indicated in the context tracking data, to implement a delay before performing the memory synchronisation, the delay continuing until one or more pending memory updates have been performed; and
  - when each of the given set of one or more contexts is determined to be absent from the context tracking data, to perform the memory synchronisation without implementing the delay.

BRIEF DESCRIPTION OF THE DRAWINGS

The present invention will be described further, by way of example only, with reference to configurations thereof as illustrated in the accompanying drawings, in which.

DESCRIPTION OF EXAMPLE CONFIGURATIONS

Figure 1:
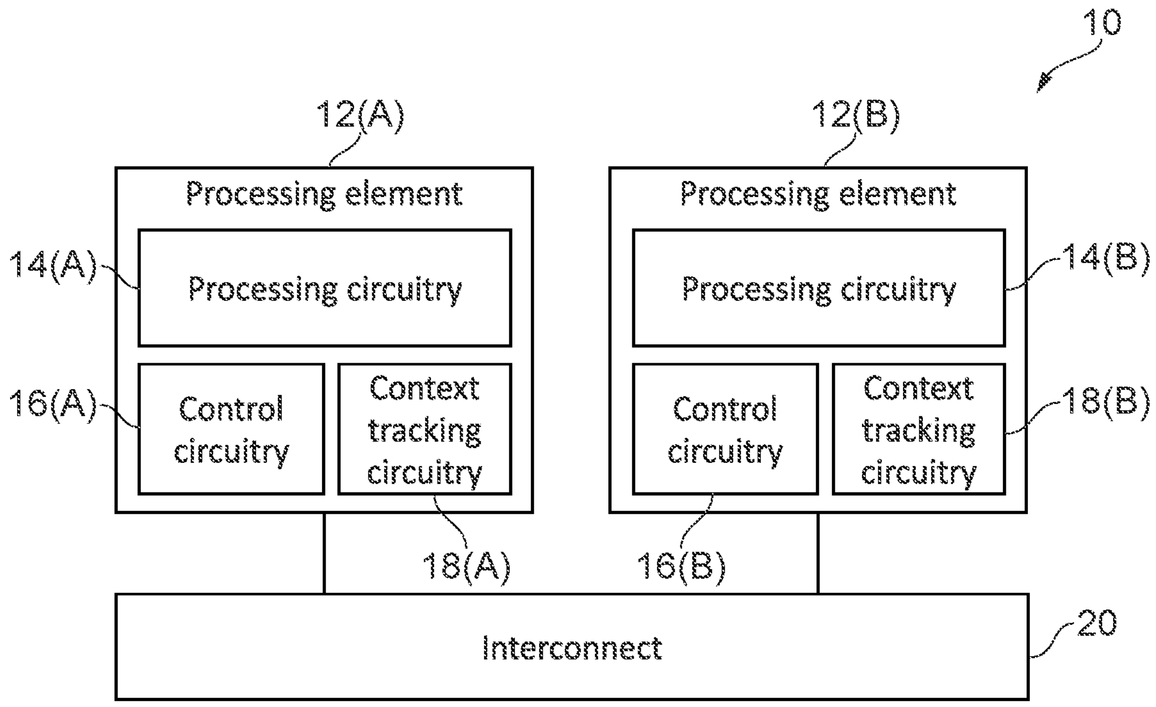
FIG. 1 schematically illustrates an apparatus according to some configurations of the present techniques.

Before discussing the configurations with reference to the accompanying figures, the following description of configurations is provided.

In some configurations there is provided an apparatus comprising one or more processing elements, each processing element of the one or more processing elements comprising processing circuitry configured to perform processing operations. The processing operations are carried out in one of a plurality of processing contexts. Each of the one or more processing elements also comprises context tracking circuitry configured to store context tracking data indicative of active contexts of the plurality of processing contexts in which the processing operations have been carried out by the processing circuitry. Each of the one or more processing elements also comprises control circuitry responsive to a request for a memory synchronisation occurring subsequent to at least one maintenance operation, the at least one maintenance operation associated with a given set of one or more contexts of the plurality of processing contexts, to determine whether at least one of the given set of one or more contexts is indicated in the context tracking data. The control circuitry is configured, in response to the determination: when the at least one of the given set of one or more contexts is determined to be indicated in the context tracking data, to implement a delay before performing the memory synchronisation, the delay continuing until one or more pending memory updates have been performed; and when each of the given set of one or more contexts is determined to be absent from the context tracking data, to perform the memory synchronisation without implementing the delay.

In the current disclosure, a "processing context" should be understood as an operating environment in which the processing element can operate, according to which the components of the processing element are provided with a self-consistent view of not only the components of the processing element itself, but of the whole of the apparatus in which the processing element is found, for example, including one or more further components such as a memory system to which the data processing apparatus is connected. The view of the processing system is complete from the point of view of the processing context. In other words, the processing context has all the information that is required by the processing circuitry for processing operations to be performed in that processing context. However, the processing context may not include information that is not required for processing operations to be performed in that processing context. For example, the memory system with which the data processing apparatus interacts may in fact contain a wider range of address locations than the processing circuitry of the data processing apparatus is able to see when operating in a particular context, yet the processing circuitry, when operating in that particular context, has no awareness that other inaccessible memory locations in the memory system exist. Each of the plurality of processing contexts may correspond, for example, to a process that is being carried out by the apparatus. In addition to each of the plurality of processing elements being configured to perform processing in one of the plurality of contexts, each of the plurality of contexts may be processed by one or more of the plurality of processing elements either in parallel or sequentially. For example, a given processing context may initially be processed on a first processing element of the plurality of processing elements but, subsequent to one or more context switching operations, the processing context may, subsequently, be processed on a second processing element (different to the first processing element) of the plurality of processing elements.

Because a single processing context may be processed by a plurality of processing elements and a single processing element may process a plurality of processing contexts, data associated with one or more processing contexts may be retained by the processing elements once the processing element has finished processing the context with which that data was associated. During processing, a given processing context may issue one or more maintenance operations relating to the data that is associated with the set of one or more contexts. For example, in some configurations a context operating at a higher exception level may issue a maintenance operation relating to one or more contexts operating at a lower exception level. These maintenance operations may require one or more memory updates to be completed by the processing elements where those processing elements have outstanding memory accesses relating to the given set of one or more contexts. In some use cases, the maintenance operations may be followed by a request for a memory synchronisation requiring that all memory updates have been completed before the synchronisation can be completed. The inventor has realised that, for example dependent on how the outstanding memory accesses are tracked, it may not always be possible to quickly determine from the tracking itself, which memory accesses on the processing element (if any) are related to the given set of one or more contexts. Therefore, it is possible that a memory synchronisation received by a processing element could be delayed unnecessarily, for example, if the memory synchronisation follows a maintenance operation specifying a given set of one or more contexts where none of the given set of one or more contexts have been processed by that processing element since the last memory synchronisation. This could result in unnecessary latency and power consumption. The processing element is therefore provided with context tracking circuitry that stores context tracking data. The context tracking data indicates a subset of the plurality of processing contexts that are treated as "active" contexts. An active context is one that has been processed by the processing element since the last synchronisation operation. The control circuitry is configured, in response to receipt of the synchronisation operation subsequent to one or more maintenance operations associated with a given set of one or more contexts, to determine whether any of (at least one of) the given set of one or more contexts is indicated in the context tracking data and, if so, to delay the memory synchronisation until one or more pending memory updates have been performed. When it is determined that none of the given set of one or more contexts are indicated in the context tracking data, the delay can be omitted and the memory synchronisation can be dealt with without delay resulting in reduced latency. In some configurations the control circuitry is configured, when implementing the delay, to delay the memory synchronisation until one or more pending memory updates associated with the at least one maintenance operation have been performed. In some configurations the delay is implemented until all pending memory updates associated with the at least one maintenance operation have been performed. In other configurations, the delay is implemented until all pending memory updates have been performed, independent as to whether those memory updates are associated with the at least one maintenance operation or not.

The delay is associated with the time for the pending memory accesses to be performed, and may also be associated with the time taken to determine whether or not there are any pending memory updates. Where a result of the determination is that there are no such pending memory updates, the delay is merely the time taken to determine that there are no such pending memory updates. For example, in some use cases one or more maintenance operations associated with one or more contexts may be received by a processing element which are associated with pending memory accesses. However, if there is a sufficient delay between the maintenance operations and the request for memory synchronisation, each of the one or more memory accesses associated with the maintenance operation may already have been completed by the time at which the request for memory synchronisation is received and, as a result, there is no delay associated with the updates being performed.

The different circuitry blocks that are comprised in each of the one or more processing elements (e.g., processing circuitry, control circuitry, and context tracking circuitry) may be provided as discrete circuitry blocks, each configured to provide the functions defined in association with that circuitry block. Alternatively, the circuitry blocks of each of the processing elements may be each provided as part of one or more discrete circuitry blocks that together perform the functions described in relation to the processing blocks.

In some configurations each processing element comprises a translation lookaside buffer (TLB) configured to store translations between a first address space associated with one of the plurality of processing contexts and a second address space, and the at least one maintenance operation comprises a translation lookaside buffer maintenance operation. In some configurations the first address may be a virtual address and the second address may be a physical address. In some configurations at least one of the first address and the second address may be an intermediate physical address with the TLB storing translations between a virtual address and an intermediate physical address and between an intermediate physical address and a physical address. The TLB maintenance operation may, for example, be a request requiring invalidation of one or more entries of a TLB that are associated with the given set of one or more contexts. In such configurations, any outstanding read/write requests may need to be completed before the TLB maintenance operation. Because the read/write requests are typically tagged by a second address (e.g., a physical address or an intermediate physical address) and it may therefore be difficult to determine whether that read/write transaction is associated with the given set of one or more contexts which may be identified using a first address (e.g., an intermediate physical address or a virtual address).

The format of the context tracking data can be variously defined. In some configurations the context tracking data comprises a set of context identifiers. For example, the context tracking data could be provided by a region of storage space capable of storing a predetermined number of context identifiers with a new context identifier being added to the storage space each time a new one of the plurality of contexts is recognised by the control circuitry.

In some configurations the context tracking data is stored as a filtered data set generated by applying a filter to context identifiers associated with each of the active contexts; and the control circuitry is configured to determine whether at least one of the given set of one or more contexts is included in the filtered data set by applying the filter to the given set of one or more contexts to generate a corresponding filtered context identifier, and comparing the corresponding filtered context identifier to the context tracking data. In some configurations, rather than storing the entire context identifier, the filter may be arranged to select a subset of bits of the context identifiers to be stored. For example, if the context identifier is represented as an N-bit value, the filter may filter the context identifiers to generate N-M bits (N minus M bits) that can be stored as context tracking data so that each stored value corresponds to 2M possible context identifiers. Whilst this could potentially result in false positives when the determination as to whether a given context is identified in the context tracking data, this approach would ensure that there are no false negatives and would reduce the amount of storage space required for the context identifiers. Furthermore, this approach would avoid placing an upper bound on the number of contexts that could be tracked.

In some configurations the context tracking data comprises a single bit vector generated as a logical OR of each filtered context identifier associated with the active contexts. Therefore, rather than storing a list of context identifiers the single bit vector may be provided indicative of a plurality of context identifiers. In some configurations, the single bit vector is generated by converting the context data into a one hot representation and generating the single bit vector using the logical OR function. Subsequently, when determining if a given context is comprised in the context tracking data, it can simply be determined if the one hot representation of the context identifier is included in the single bit vector. This approach provides a particular compact solution for storing the context tracking data.

In some configurations the filter circuitry implements a bloom filter. A bloom filter is a probabilistic data structure that is based on hashing. Typically, a bloom filter adds elements to a set and can then perform a test to determine if an element is in the set. The elements themselves are not added to the set. Instead a hash of the elements is added to the set. When testing if an element is in the bloom filter, false positives are possible but false negatives are not. For example, a bloom filter will determine that an element is definitely not in the set or that it is possible the element is in the set. The bloom filter is a particularly space efficient approach to implementing a filter.

Whilst the plurality of processing contexts may, in general, each relate to a different one of a plurality of processes, in some configurations the apparatus is configured to provide a virtualized operating environment supporting a plurality of virtual machines each associated with a virtual machine identifier; and each virtual machine of the virtual machines corresponds to one or more of the plurality of processing contexts identified by the virtual machine identifier associated with that virtual machine. Accordingly, the virtualized operating environment provides one manner in which the processing element can operate (e.g., execute data processing instructions) in more than one context. A given virtual machine (typically comprising a particular guest operating system and set of applications which run on that guest operating system) interacts with the hardware of the processing element (e.g., in particular in the present context the processing circuitry and memory system interaction circuitry) when operation of that virtual machine is the present context of operation for the processing element. The virtual machine identifier is an unique identifier associated with that virtual machine and that can be used to identify a plurality of processing contexts that correspond to that virtual machine. In some configurations each context identifier may comprise a virtual machine identifier and an address space identifier (ASID) uniquely specifying the context associated with the virtual machine identifier. In such configurations the context tracking data may be associated only with the virtual machine identifier so that all contexts having that virtual machine identifier are indicated in the context tracking data.

In some configurations at least one of the virtual machines is configured to implement a distributed virtual memory and the memory synchronisation is a distributed virtual memory synchronisation. Distributed virtual memory improves parallelisation by maintaining local copies of data items. For example, a virtual machine implementation may run one or more processes or applications across multiple processing elements. For example, an application may be multi-threaded with each thread running in parallel on different processing elements, or sequentially with different threads run one after another on the same processing element. In such a situation, the operating system of the virtual machine has to manage memory, for example, by assigning and reclaiming pages and may issue maintenance operations in respect of those applications. The distributed virtual memory synchronisation (DVM sync) is an operation that allows the operating system of the virtual machine to ensure that the application is being executed properly whilst its pages are being remapped.

In some configurations the context tracking data comprises, for each active context of the active contexts, information indicative of at least one of: a virtual machine identifier associated with the active context; a security state associated with the active context; and an exception level associated with the active context. In some configurations there may be plural contexts associated with each virtual machine identifier. For example, the context may be identified through a combination of a virtual machine identifier and an ASID with the context tracking data indicating the virtual machine identifier and omitting the ASID. As a result, the context tracking data identifiers all active contexts associated with a given VMID. In some configurations the context tracking data may be split into virtual machine tracking context data and other context data comprising information indicative of the security state and/or the exception level associated with the active context. In some configurations the control circuitry may be configured to omit the check of the virtual machine tracking context data dependent on the other context data. For example, if the other context data indicates a security state and/or exception level that is not associated with virtual machines that were active on the processing element then it may not be necessary to check the virtual machine tracking context data.

In some configurations the control circuitry is responsive to the context tracking data meeting a predetermined condition to perform a tracking data reset procedure comprising clearing the context tracking data. For configurations in which a more compact form of the context tracking data has been used, the context tracking data may saturate, for example, after multiple different processing contexts have been processed on any one processing element. As the context tracking data gets closer to saturating, the likelihood that, for a maintenance operation specifying any given context, the determination as to whether the given context is included in the context tracking data will return a false positive increases. The inventors have realised that the performance lost as the number of false positives increases may be greater than the performance cost associated with performing the tracking data reset procedure to reset the context tracking data. Hence, overall performance is increased through the provision of the reset procedure.

The predetermined condition may be variously defined. In some configurations the context tracking circuitry comprises storage space for a first number of context identifiers and the predetermined condition is met when storage of a new context identifier in the context tracking circuitry would exceed the storage space. In some configurations the context tracking data is stored as a filtered data set; the control circuitry is configured to calculate a likelihood that the determination could result in a false positive; and the predetermined condition is met when the likelihood exceeds a predetermined threshold. For example, the predetermined threshold may be when the likelihood of a false positive exceeds 70%, 80%, etc.

The reset procedure may handle synchronisation operations subsequent to the reset in a variety of ways. In some configurations the tracking data reset procedure comprises setting a saturation flag to indicate that the context tracking data has been cleared; and the control circuitry is responsive to the at least one maintenance operation, when the saturation flag indicates that the context tracking data has been cleared, to convert the at least one maintenance operation associated with the given set of one or more contexts to at least one maintenance operation associated with each of the plurality of processing contexts and to clear the saturation flag. The time at which the saturation flag is set can be dependent on the implementation. The saturation flag may be set at the point at which the tracking data is cleared or may be set immediately thereafter. The saturation flag may be a dedicated flag or encoded into a plurality of flag bits incorporated as part of a general flag register. The inventors have realised that any performance penalty associated with converting the maintenance operation to one associated with each of the plurality of processing contexts can be outweighed by the benefits of being able to quickly determine whether a synchronisation operation can be performed without implementing the delay. By implementing the reset procedure in this way, the amount of context tracking data that is required to be stored can be reduced providing an implementation with low circuitry overhead.

In some configurations the control circuitry is responsive to receipt of the at least one maintenance operation subsequent to an earlier memory synchronisation request and when the at least one of the given set of one or more contexts is indicated in the context tracking data, to set a maintenance flag; the control circuitry is configured, when responding to the request for the memory synchronisation, to determine whether the at least one of the given set of one or more contexts is indicated in the context tracking data based on a value of the maintenance flag; and the control circuitry is responsive to completion of the memory synchronisation, to clear the maintenance flag. If the maintenance operation(s) correspond to those included in the context tracking data, the control circuitry sets the maintenance flag to indicate that a maintenance operation has been received corresponding to a context that has been active on that processing element since the last memory synchronisation operation. Once the memory synchronisation operation is complete, the maintenance flag is reset (cleared) to indicate that no maintenance operations have been received since that memory synchronisation operation matching context tracking data since the maintenance flat is only set when there is a match. The maintenance flag may be provided as a dedicated flag or may be encoded in a plurality of flag bits stored in a general flag register.

In some configurations the control circuitry is responsive to receipt of the request for the at least one maintenance operation, when the saturation flag indicates that the context tracking data has been cleared, to set the maintenance flag independent of whether any of the given set of one or more contexts are indicated in the context tracking data. When the saturation flag indicates that the context tracking data has been cleared (e.g., the saturation flag is set), the control circuitry may be configured to convert the at least one maintenance operation associated with the given set of one or more contexts to at least one maintenance operation associated with each of the plurality of processing contexts and to clear the saturation flag. In this way, the control circuitry is able to ensure that pending memory updates associated with any of the plurality of contexts have been performed before the memory synchronisation.

Whilst in some configurations the given set of one or more contexts may include the context that is currently active on the processing circuitry of the processing element, in some configurations at least one of the given set of one or more contexts is different from a current context being processed by the processing circuitry. Each maintenance operation of the at least one maintenance operation may be received from any other processing element comprised in the apparatus. In some configurations each of the given set of one or more contexts is different from the current context being processed by the processing circuitry.

Particular configurations will now be described with reference to the figures.

FIG. 1 schematically illustrates an apparatus 10 according to some configurations of the present techniques. The apparatus 10 is provided with processing elements 12 including a first processing element 12(A) and a second processing element 12(B). Each processing element 12 is provided with processing circuitry 14, control circuitry 16, and context tracking circuitry 18. The first processing element 12(A) and the second processing element 12(B) are connected by an interconnect 20 which may also connect to, for example, other processing elements (not illustrated) and a memory system (not illustrated). The processing circuitry 14 is configured to perform processing operations which are carried out in one of a plurality of processing contexts. The context tracking circuitry 18 is configured to store context tracking data indicative of active contexts of a plurality of processing contexts in which the processing operations have been carried out. The control circuitry 18 is arranged to respond to a request for memory synchronisation (for example, received from another one of the processing elements 12 via the interconnect 20), to determine whether any maintenance operations specifying a context that has been "seen" (has been processed by) the processing element since a last memory synchronisation have been received. If so, the control circuitry is configured to delay the memory synchronisation until pending updates associated with the maintenance operation have been completed.

Figure 2:
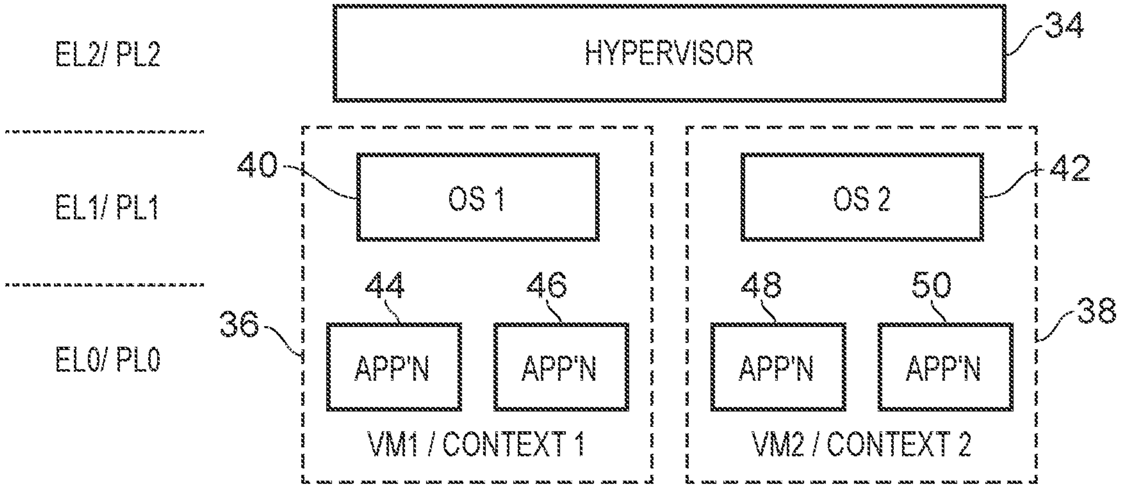
FIG. 2 schematically illustrates a virtualised environment operating on an apparatus according to some configurations of the present techniques.

FIG. 2 schematically illustrates one feature of the apparatus 10 shown in FIG. 1, namely that the processing element 12(A) and the processing element 12(B) of the apparatus 10 support virtualized operating environments. These virtualized operating environments may be viewed in the hierarchical manner schematically shown in FIG. 2, in which a hypervisor 34 which maintains overall control of the virtualization thus provided operates at the highest privilege level shown in the figure referred to as "exception level number 2" (EL2) or "privilege level 2" (PL2)). A further, higher privilege level (EL3) may also be provided, where for example a secure monitor operates. The hypervisor operates at the highest privilege level, which may be a secure or non-secure privilege level, and the privilege level that manages virtualization. The hypervisor controls which of several virtual machines is currently operating in each processing element. For clarity of illustration only FIG. 2 just shows two virtual machines 36 and 38, but it should be appreciated that the apparatus can be configured to support many more virtual machines. Each virtual machine is represented in FIG. 2 by an operating system (OS1 40 and OS2 42 respectively) and a number of applications running under control of that operating system 44, 46 and 48, 50 respectively. Again, for clarity of illustration only, only two applications are shown within each virtual machine, but there may in fact be many more applications which each virtual machine is capable of running. The guest operating systems 40 and 42 typically operate at an intermediate level of privilege (EL1/PL1) whilst the applications typically operate at a lowest level of privilege (EL0/PL0). Each virtual machine which may run on the processing elements thus represents a distinct context in which the processing element, and in particular the processor (processing circuitry) of the processing element can operate. Note that the virtual machines may be hosted by just one processing element or may be distributed across several processing elements, depending on the processing resource which it is appropriate to make available to each virtual machine. Where a real-time virtual machine is to be provided it may be more likely to be restricted to just one processing element (although multiple processing element implementations may also be possible), whilst a non-real-time virtual machine may be configured to be distributed across several processing elements.

Figure 3:
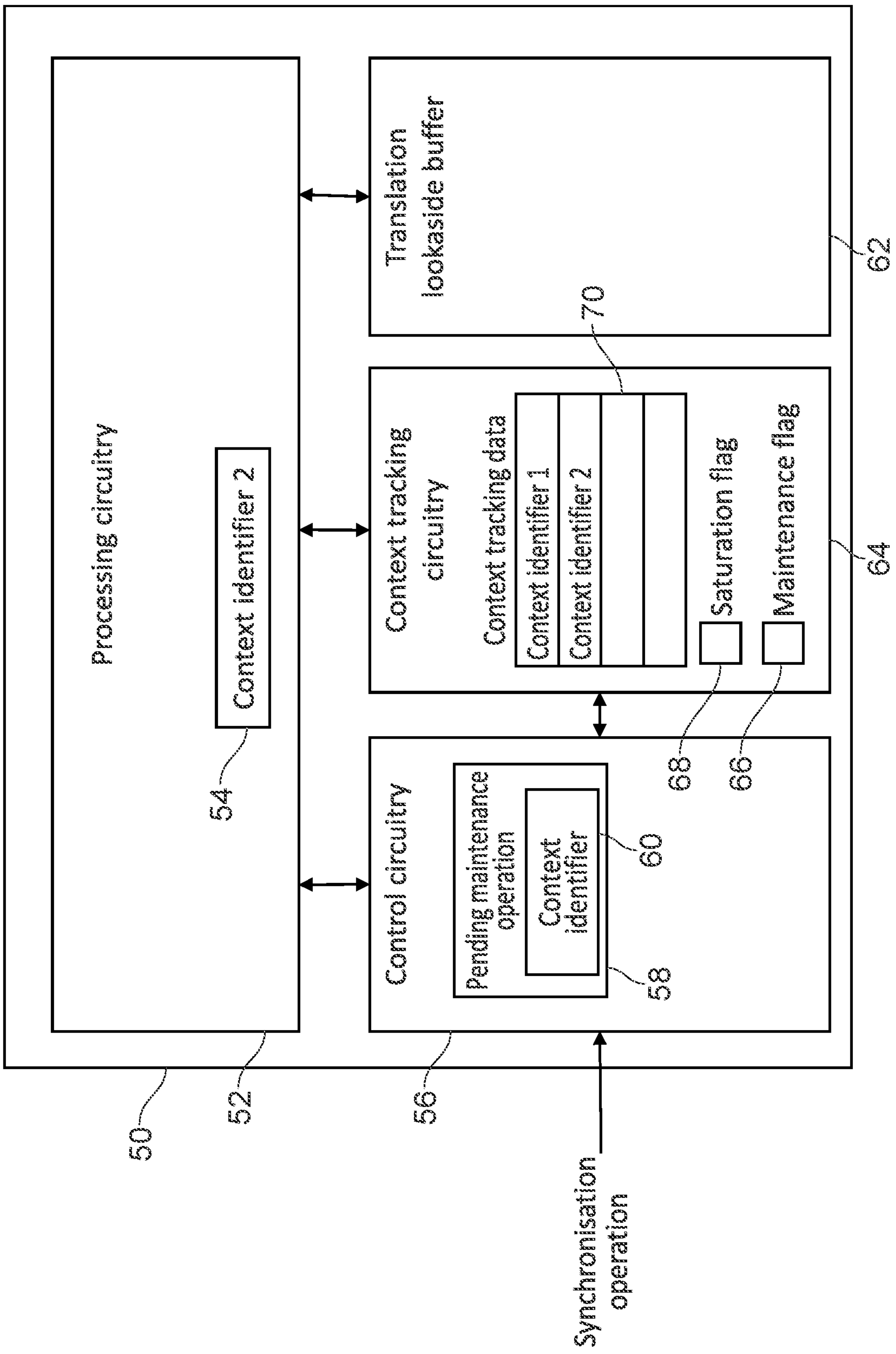
FIG. 3 schematically illustrates further details of an apparatus according to some configurations of the present techniques.

FIG. 3 schematically illustrates further details of a processing element 50 according to some configurations of the present techniques. The processing element 50 is provided with processing circuitry 52, control circuitry 56, context tracking circuitry 64, and a translation lookaside buffer 62. The translation lookaside buffer 62 is provided to store translation data between a first address space used by the processing circuitry 52 to address data items (for example, a virtual address space) and a second address space used to identify data items in storage (for example, a physical address space) and may be referenced by the processing circuitry when requesting access to a data item (or block of instructions) stored at a location in the second address space. For the virtualisation case, discussed in relation to FIG. 2, the hypervisor may assign regions of physical address space to each virtual machine and the translation lookaside buffer 62 may store address translation data in relation to each virtual machine that has been processed by the processing element.

The processing circuitry 52 is arranged to perform processing operations in one of the plurality of contexts. The processing circuitry 52 may store a context identifier 54 indicative of a current processing context of the processing circuitry 54. The context tracking circuitry 64 is arranged to store context tracking data 70 indicative of processing contexts that have been actively processed by the processing circuitry 52 of the processing element 50. In the illustrated configuration, the context tracking circuitry 64 is storing context tracking data 70 indicating that contexts identified by context identifier 1 and context identifier 2 have been actively processed by the processing circuitry 50. The context tracking circuitry 64 is also provided with a saturation flag 68 and a maintenance flag 66. The saturation flag 68 is set in response to the context tracking data being cleared and the maintenance flag 66 is set when it is determined that the processing circuitry has received a maintenance operation identifying one of the contexts that is indicated in the context tracking data 70. The control circuitry 56 is responsive to requests for memory synchronisation to determine if, since a previous memory synchronisation, any maintenance operations, for example, the pending maintenance operation 58 indicating context identifier 60, have been received where the indicated context identifier 60 is also indicated in the context tracking data 70 maintained by the context tracking circuitry 64.

On receipt of a maintenance operation 58 the control circuitry 56 determines whether the maintenance operation 58 has a context identifier 60 that corresponds to one of the context identifiers stored in the context tracking data 70. If a match is determined, then the control circuitry sets the maintenance flag 66 to indicate that a maintenance operation has been received since a previous synchronisation operation. If the pending maintenance operation 58 indicates a context identifier 60 that is not included in the context tracking data 70, then the control circuitry does not modify a value of the maintenance flag 66 (i.e., if the maintenance flag 60 is previously set, then it remains set and if the maintenance flag 60 was previously clear then it remains clear). In this way, the control circuitry 56 is able to use the maintenance flag 66 to track whether there have been any maintenance operations, indicating a context identifier 60 that is included in the context tracking data 70, received since a previous memory synchronisation. On receipt of a synchronisation operation the control circuitry 56 determines whether or not the maintenance flag 66 is set. If the maintenance flag 66 is not set, then the control circuitry 56 causes the memory synchronisation to be performed without delay, e.g., at the next available opportunity. On the other hand, if the maintenance flag 66 is set, then the control circuitry 56 implements a delay before performing the memory synchronisation. The control circuitry 56 is configured to cause the delay to continue until pending memory updates associated with the maintenance operations, have been completed. The control circuitry 56 is configured to cause the maintenance flag 66 to be cleared once the memory synchronisation has occurred.

The saturation flag 68 is provided to indicate that the context tracking data 70 has been cleared as a result of the context tracking data 70 saturating. In the illustrated configuration the context tracking circuitry 64 is provided with storage to store four context identifiers as part of the context tracking data 70. It would be readily apparent to the skilled person that the context tracking circuitry 64 could be provided with any amount of storage for any type/format of context tracking data dependent on the implementation. When the context tracking data 70 saturates, it will no longer be possible to add new context identifiers when the processing element 50 performs processing in a different processing context. The control circuitry 56 is responsive to the saturation of the context tracking circuitry (for example, responsive to receipt of a new context identifier that is not included in the context tracking data 70 when the context tracking data 70 already stores a context identifier in each possible storage location of the context tracking data 70), to clear the context tracking data 70 and to set the saturation flag 68. Subsequently, when the saturation flag 68 is set, the control circuitry 56 is responsive to receipt of a maintenance operation 58 specifying a particular context identifier 60 to convert the maintenance operation 58 to a maintenance operation specifying each context and to set the maintenance flag 66. The saturation flag 68 is cleared once the maintenance operation 58 has been upgraded to a maintenance operation specifying each context and the maintenance flag 66 has been set.

Figure 4:
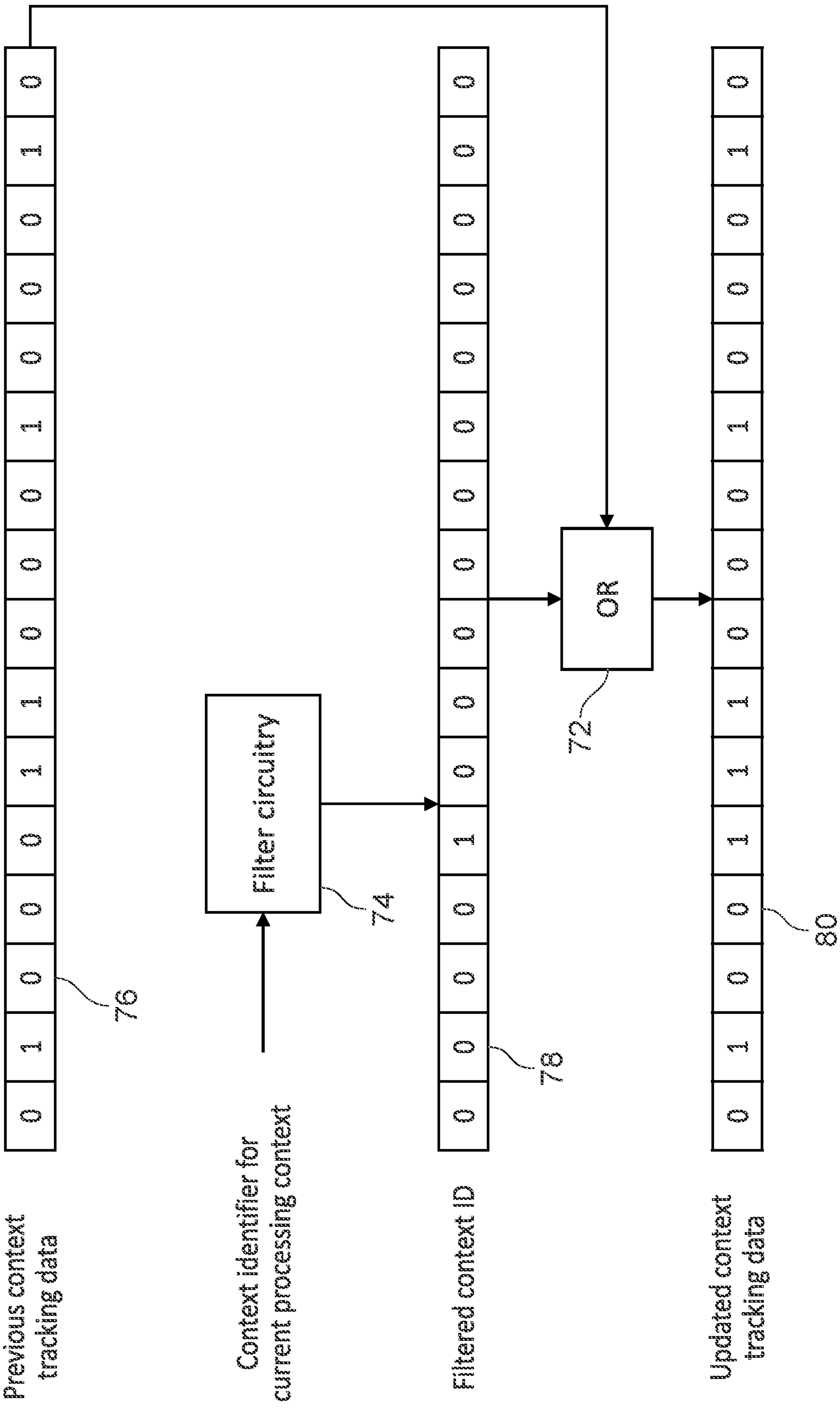
FIG. 4 schematically illustrates the generation of context tracking data according to some configurations of the present techniques.
Figure 5:
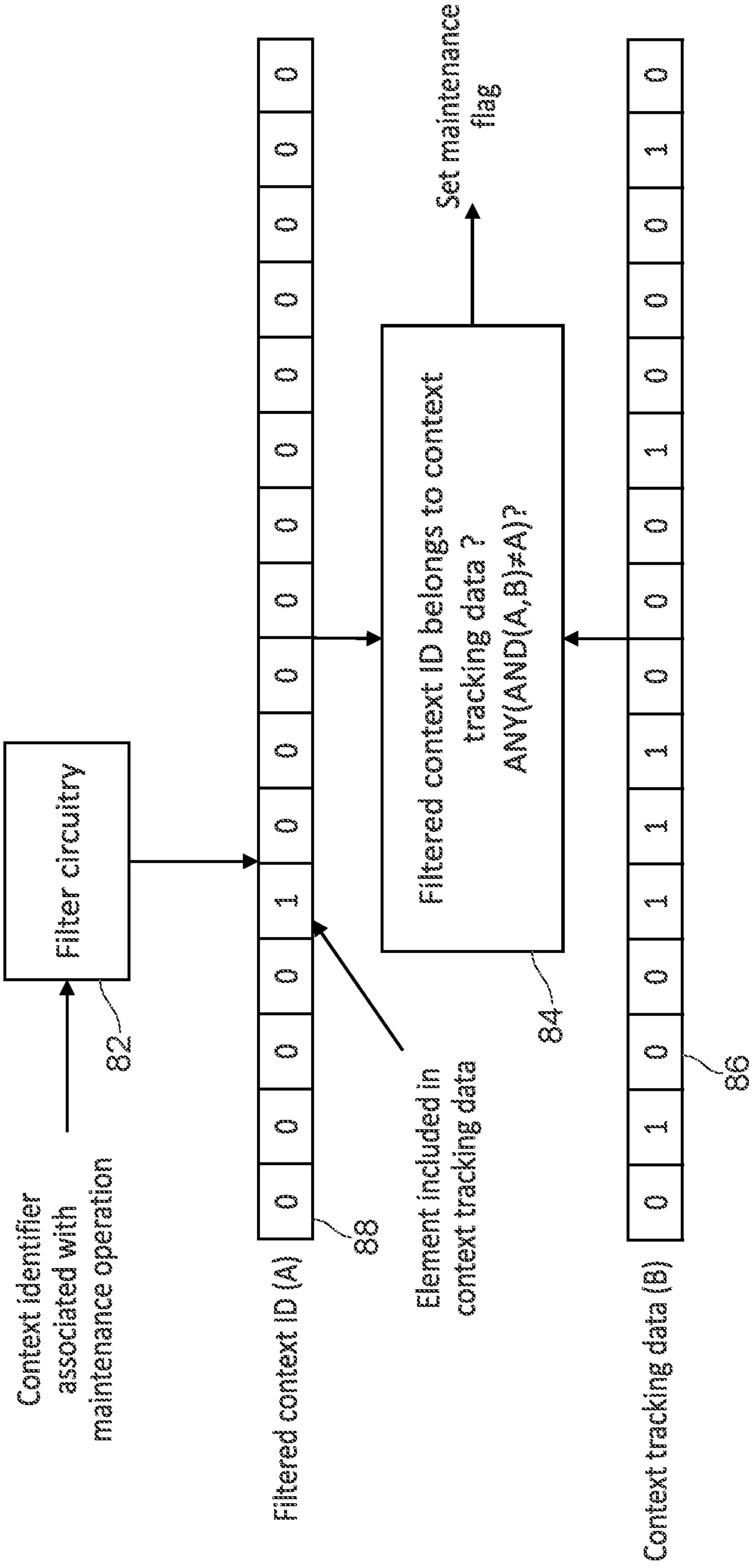
FIG. 5 schematically illustrates the determination of whether to delay performing memory synchronisation according to some configurations of the present techniques.
Figure 6:
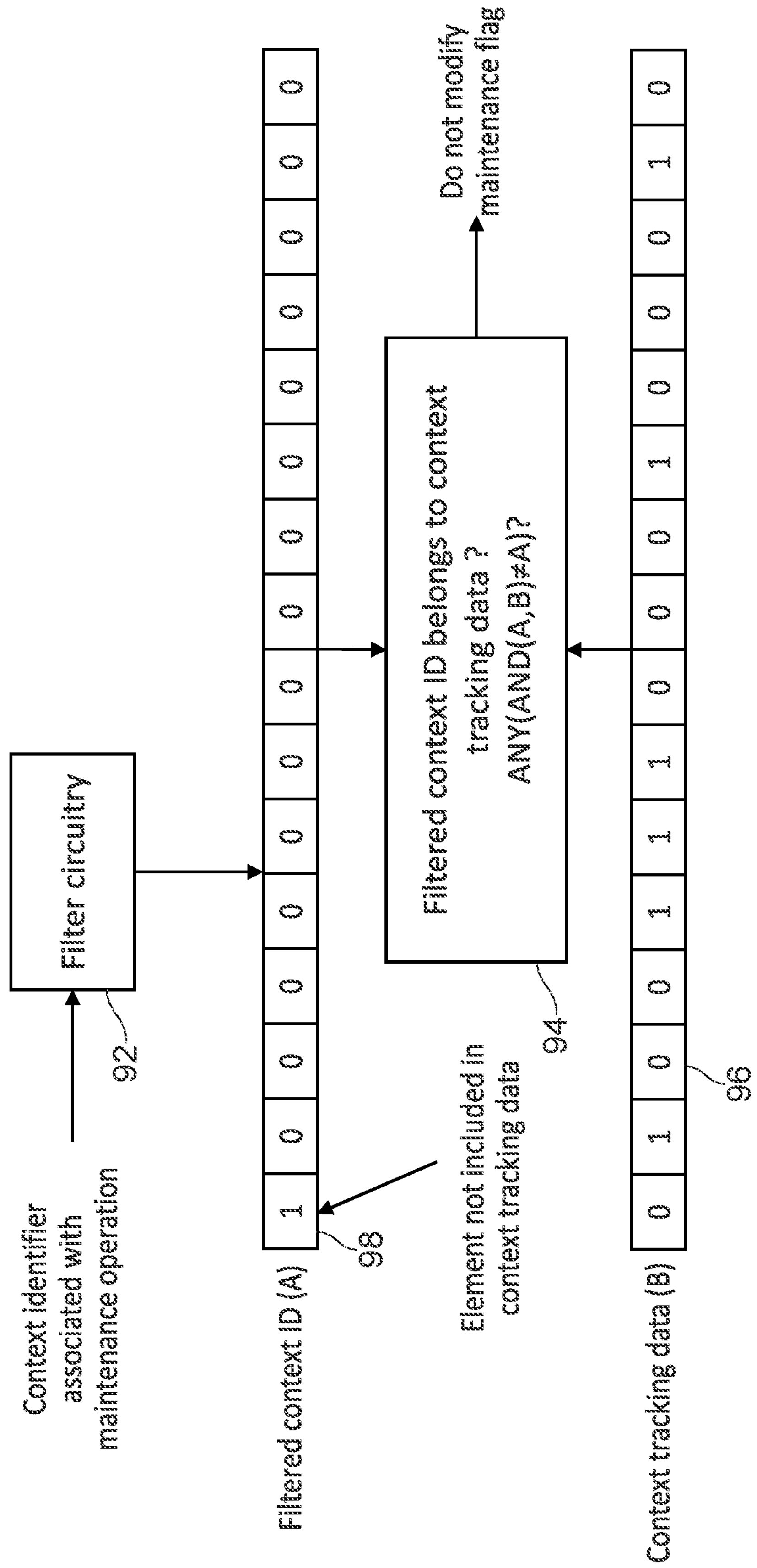
FIG. 6 schematically illustrates the determination of whether to delay performing memory synchronisation according to some configurations of the present techniques.

FIGS. 4 to 6 schematically illustrate one possible format of the context tracking data according to some configurations of the present techniques. FIG. 4 schematically illustrates the use of filter circuitry 74 to filter a received context identifier in order to generate a filtered context identifier 78. The filter circuitry 74 is arranged to receive a context identifier, for example, a 16-bit or a 32-bit context identifier and apply a hash function to generate a 16-bit one hot filtered context identifier 78. The filter circuitry 74 is a many to one filter which maps plural different context identifiers to a same filtered context identifier. This approach maps the space of all possible context identifiers to a much smaller space of filtered context identifiers (16 possible different values in the 16-bit one hot representation illustrated in FIG. 4). The context tracking circuitry can therefore track previously observed context identifiers by tracking combinations of the 16 possible values of the filtered context identifier (rather than tracking $2^K$ possible values of a K-bit context identifier). The filtered context identifier 78 is incorporated into the previous context tracking data 76 by performing a logical OR 72 with the previous context tracking data 76 to generate the updated context tracking data 80. The previous context tracking data 76 is the logical OR of all filtered context identifiers that have previously been actively processed by the processing circuitry of that processing element. In the illustrated configuration, the previous context tracking data 76 contains logical ones at bit positions 1, 5, 9, 10, and 14 with logical zeros at bit positions 0, 2, 3, 4, 6, 7, 8, 11, 12, 13, and 15. The filtered context identifier 78 is a one hot representation and contains a logical one at bit position 11. The updated context tracking data 80 is generated by taking the logical OR of the previous context tracking data 76 and the filtered context identifier 78 and has ones at bit positions 1, 5, 9, 10, 11, and 14 with logical zeros at bit positions 0, 2, 3, 4, 6, 7, 8, 12, 13, and 15. Subsequently, the control circuitry will be able to determine, with reference to the updated context tracking data 80, that the filtered context identifier 78 having a logical one at bit position 11 has already been seen by the processing circuitry and therefore that any context identifier that maps to the filtered context identifier 78 having a logical one at bit position 11 might have been seen by the processing circuitry.

FIGS. 5 and 6 schematically illustrate the determination as to whether or not the maintenance flag should be modified in response to a maintenance operation associated with a particular context identifier.

In FIG. 5, the context tracking data (referred to as B) is the updated context tracking data generated in FIG. 4 having ones at bit positions 1, 5, 9, 10, 11, and 14 with logical zeros at bit positions 0, 2, 3, 4, 6, 7, 8, 12, 13, and 15. The control circuitry receives a context identifier associated with a maintenance operation at the filter circuitry 82. The filter implemented in response to receipt of the maintenance operation associated with the context identifier is the same filter that is implemented in response to a context identifier of a context that is being processed by the processing circuitry (as illustrated in FIG. 4). The context identifier is passed through the filter circuitry 82 to derive the filtered context identifier 88 (referred to as A). The filtered context identifier 88 and the context tracking data 86 are passed to the comparison circuitry 84 which determines whether the filtered context identifier 88 belongs to the context tracking data 86. The comparison circuitry 84 performs an operation to determine if any of the bits of A AND B are not equal to A. In other words, the comparison circuitry performs a determination to determine if the one hot bit in the filtered context identifier 88(A) appears in the context tracking data 86(B). In the illustrated configuration, the filtered context identifier 88 has, as the one hot bit, a logical one in bit position 11 which is included in the context tracking data 86. The filtered context identifier 88 may have been generated as a result of the same context identifier as the one in FIG. 5 that caused the bit in the $11^{th}$ bit position of the context tracking data 86 to be set such that the comparison circuitry 84 is generating a true hit. Alternatively, the context identifier associated with the maintenance operation may be different to the context identifier as the one in FIG. 5 that caused the bit in bit position 11 of the context tracking data 86 to be set. Hence, the comparison circuitry is generating a false positive due to the coincidence in the filtered context identifier generated by the two context identifiers. Regardless as to whether the hit is a false hit or a true hit, as a result the comparison circuitry 84 outputs a signal indicating that the maintenance flag should be set.

In FIG. 6, the context tracking data (referred to as B) is the updated context tracking data generated in FIG. 4 having ones at bit positions 1, 5, 9, 10, 11, and 14 with logical zeros at bit positions 0, 2, 3, 4, 6, 7, 8, 12, 13, and 15. The control circuitry receives a context identifier associated with a maintenance operation at the filter circuitry 92. The filter implemented in response to receipt of the maintenance operation associated with the context identifier is the same filter that is implemented in response to a context identifier of a context that is being processed by the processing circuitry (as illustrated in FIG. 4). The context identifier is passed through the filter circuitry 92 to derive the filtered context identifier 98 (referred to as A). The filtered context identifier 98 and the context tracking data 96 are passed to the comparison circuitry 94 which determines whether the filtered context identifier 98 belongs to the context tracking data 96. The comparison circuitry 94 performs an operation to determine if any of the bits of A AND B are not equal to A. In other words, the comparison circuitry performs a determination to determine if the one hot bit in the filtered context identifier 98(A) appears in the context tracking data 96(B). In the illustrated configuration, the filtered context identifier 98 has, as the one hot bit, a logical one in bit position 15 which is not included in the context tracking data 96. As a result the comparison circuitry 94 outputs a signal indicating that the maintenance flag should not be modified.

Figure 7:
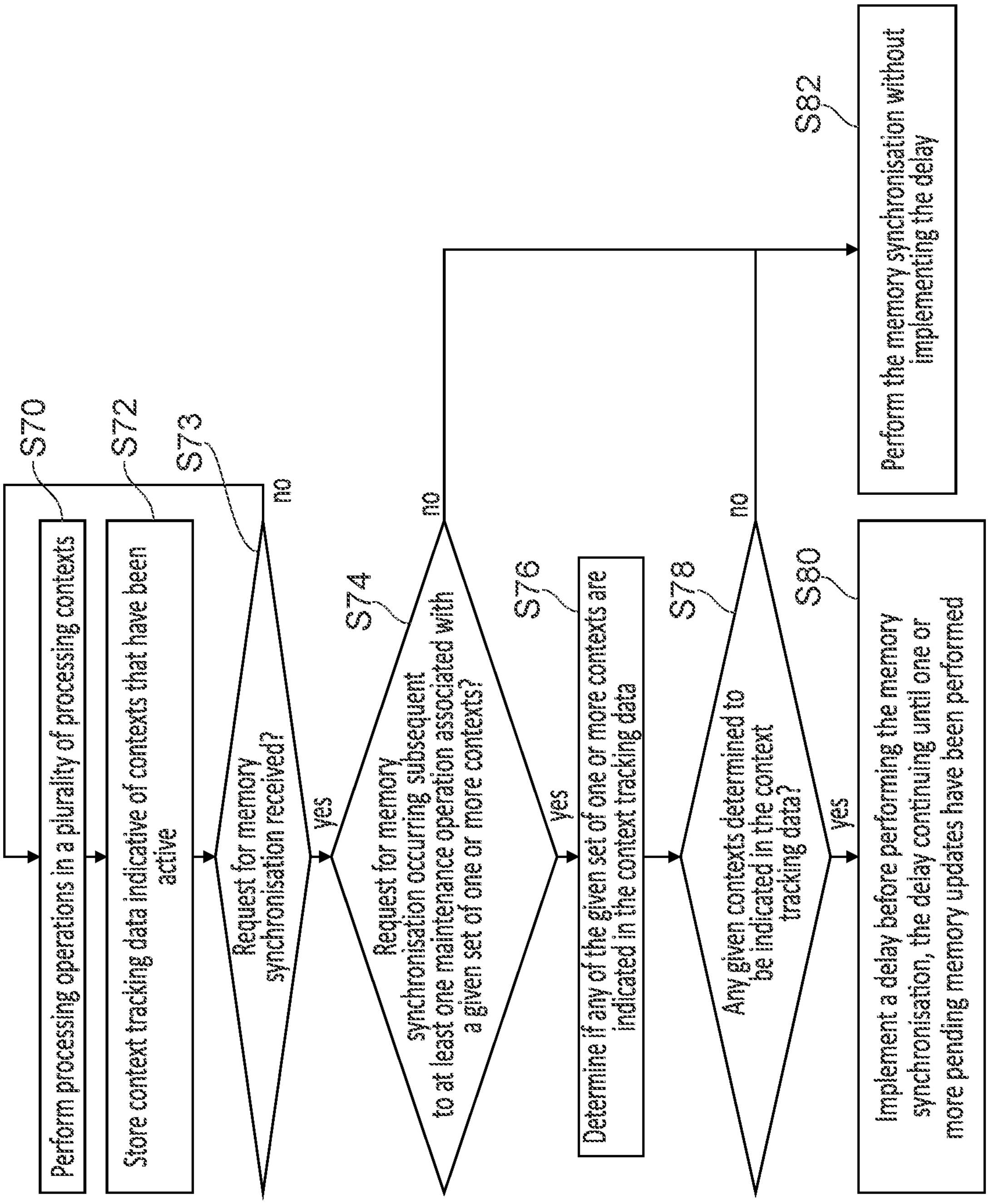
FIG. 7 schematically illustrates a sequence of steps carried out according to some configurations of the present techniques.

FIG. 7 schematically illustrates a sequence of steps carried out by a processing element of an apparatus according to some configurations of the present techniques. Flow begins at step S70 where processing operations are performed, by processing circuitry, in a plurality of different contexts. Flow then proceeds to step S72 where context tracking circuitry stores context tracking data indicative of contexts that have been active on that processing element. Flow then proceeds to step S73 where it is determined if a request for memory synchronisation has been received. If, at step S73, it is determined that a request for memory synchronisation has not been received, then flow returns to step S70. If, at step S73, it is determined that a request for memory synchronisation has been received, then flow proceeds to step S74 where it is determined whether or not the request for memory synchronisation has occurred subsequent to at least one maintenance operation associated with a given set of one or more contexts. If, at step S74, it is determined that the request has not been received subsequent to at least one maintenance operation associated with the given set of one or more contexts, then flow proceeds to step S82 where the memory synchronisation is performed without delay. If, at step S74, it is determined that the request for memory synchronisation occurred subsequent to at least one maintenance operation associated with the given set of one or more contexts, then flow proceeds to step S76. At step S76 it is determined if any of the given set of one or more contexts are indicated in the context tracking data before flow proceeds to step S78. At step S78, the result of the determination made at step S76 is evaluated. If, at step S78, it is determined that none of the given set of one or more contexts is not indicated in the context tracking data then flow proceeds to step S82 where the memory synchronisation is performed without delay. If, at step S78, it was determined that at least one of the given set of one or more contexts was indicated in the context tracking data then flow proceeds to step S80 where a delay is implemented before the memory synchronisation is performed. The delay is arranged to continue until one or more pending memory updates (for example, associated with the maintenance operation) have been performed.

Figure 8:
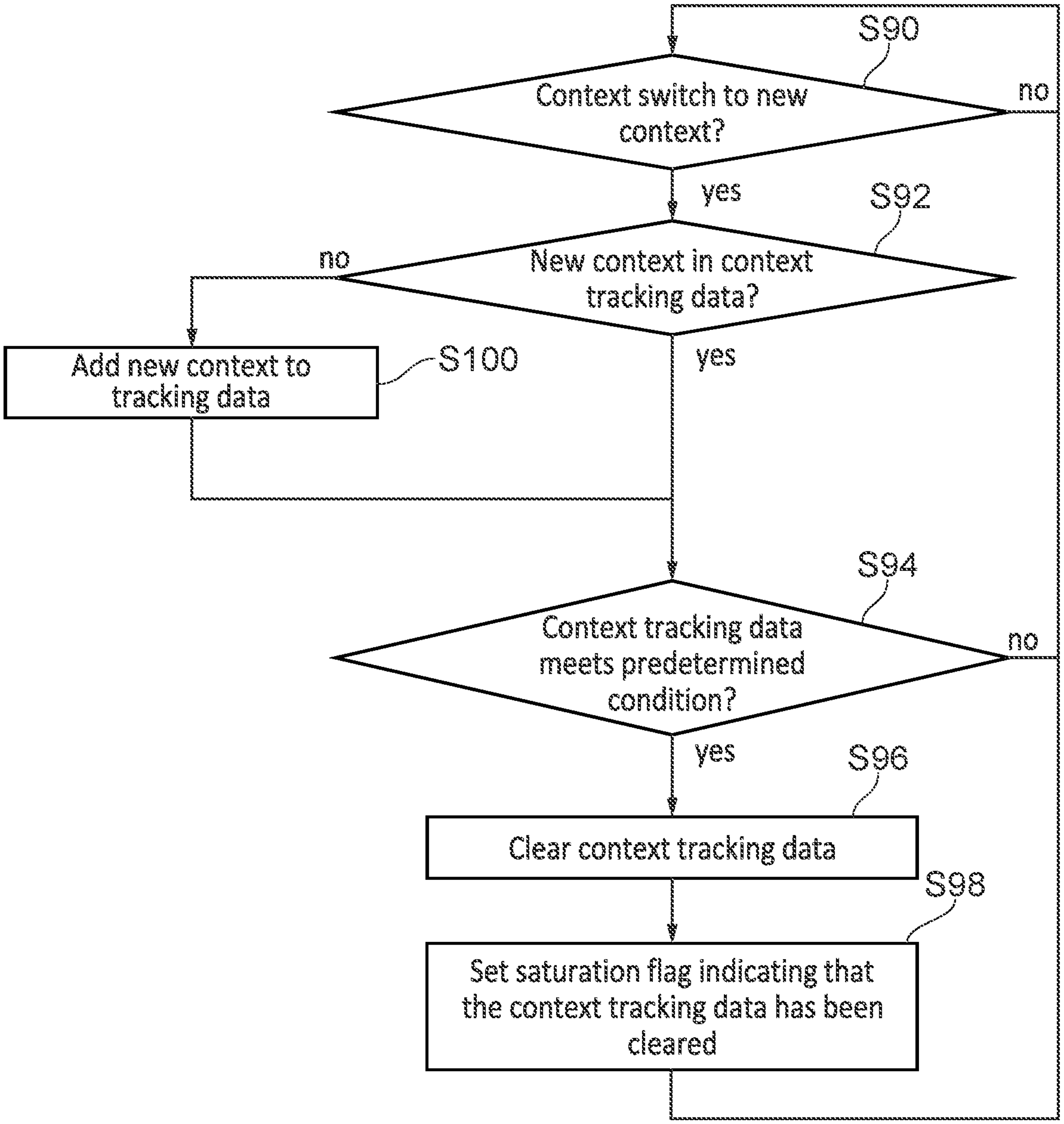
FIG. 8 schematically illustrates a sequence of steps carried out according to some configurations of the present techniques.

FIG. 8 schematically illustrates a sequence of steps carried out by a processing element in response to a context switch. Flow begins at step S90 where it is determined whether or not a context switch is taking place. If, at step S90, it is determined that a context switch is not taking place, then flow remains at step S90. If, at step S90, it is determined that a context switch to a new context is taking place, then flow proceeds to step S92, where it is determined whether the new context is already present in the context tracking data. If, at step S92, it is determined that the new context is already present in the context tracking data then flow proceeds to step S94. If, at step S92, it is determined that the new context is not present in the context tracking data, then flow proceeds to step S100 where the new context is added to the context tracking data before flow proceeds to step S94. At step S94 it is determined whether the context tracking data meets a predetermined condition (e.g., it is determined whether the context tracking data has saturated). If, at step S94, it is determined that the context tracking data has not met the predetermined condition, then flow returns to step S90. If, at step S94, it is determined that the context tracking data has met the predetermined condition, then flow proceeds to step S96 where the context tracking data is cleared. Flow then proceeds to step S98 where the saturation flag is set to indicate that the context tracking data has been cleared before flow returns to step S90.

Figure 9:
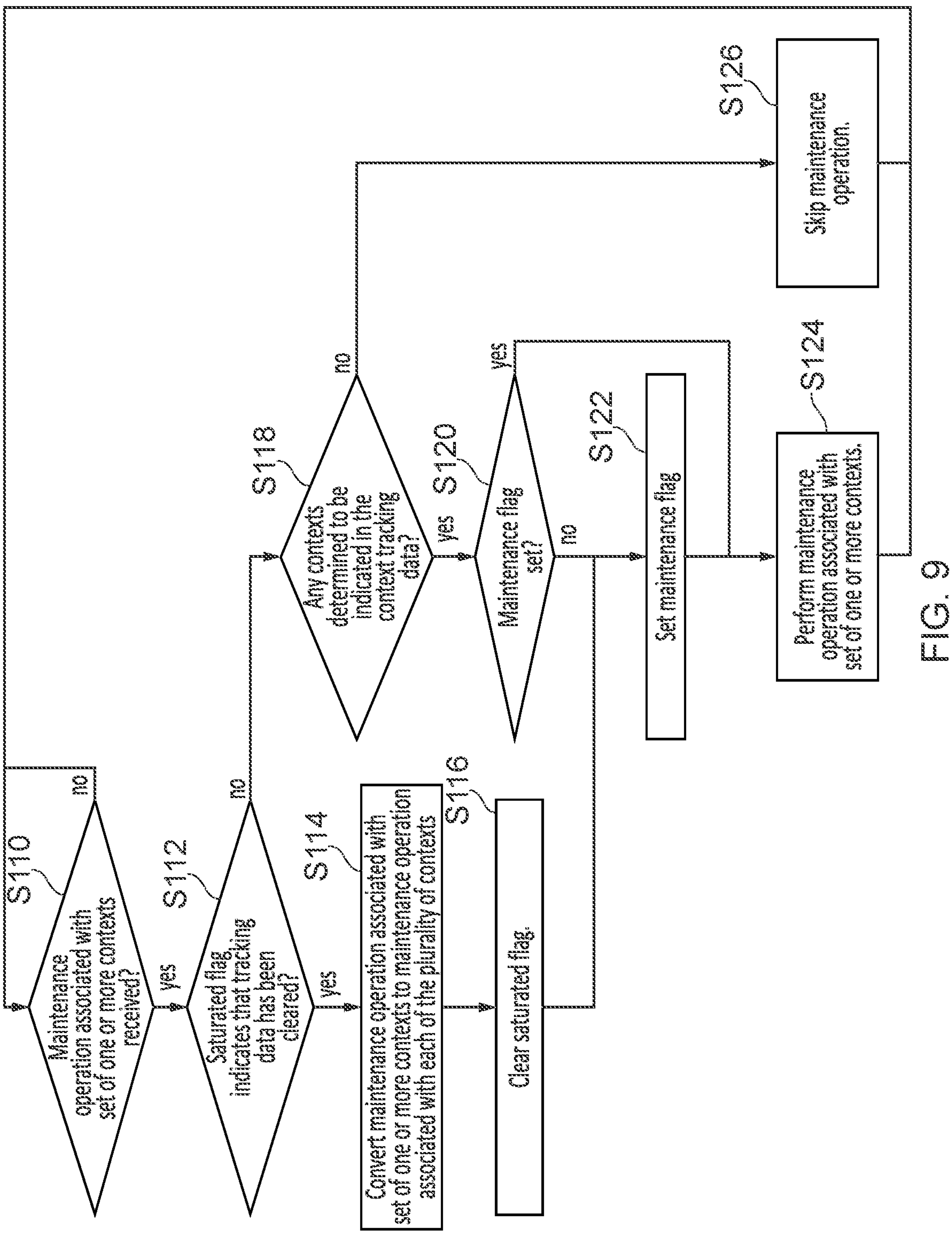
FIG. 9 schematically illustrates a sequence of steps carried out according to some configurations of the present techniques.

FIG. 9 schematically illustrates further details of the behaviour of the control circuitry in response to receipt of a maintenance operation according to some configurations of the present techniques. Flow begins at step S110 where it is determined whether or not a maintenance operation associated with a set of one or more contexts has been received. If, at step S110, it is determined that a maintenance operation associated with a set of one or more contexts has not been received, then flow remains at step S110. If, at step S110, it is determined that a maintenance operation associated with a set of one or more contexts has been received, then flow proceeds to step S112 where it is determined whether the saturated flag indicates that tracking data has been cleared. If, at step S112, it is determined that the saturated flag indicates that tracking data has not been cleared, then flow proceeds to step S118. At step S118, it is determined whether any of the set of one or more contexts associated with the maintenance operation is determined to be indicated in the context tracing data. If, at step S118, it is determined that none of the set of one or more contexts associated with the maintenance operation are indicated in the context tracking data, then flow proceeds to step S126 where the maintenance operation is skipped before flow returns to step S110.

If, at step S118, it is determined that any of the set of one or more contexts associated with the maintenance operation is indicated in the context tracking data then flow proceeds to step S120. At step S120 it is determined if the maintenance flag is set. If, at step S120, it is determined that the maintenance flag is not set, then flow proceeds to step S122 where the maintenance flag is set before flow proceeds to step S124. If, at step S120, it is determined that the maintenance flag is set, then flow proceeds to step S124. At step S124 the maintenance operation associated with the context is triggered to be performed before flow returns to step S110.

If, at step S112, it was determined that the saturated flag was set, then flow proceeds to step S114 where the maintenance operation associated with the set of one or more contexts is converted to a maintenance operation that is associated with each of the plurality of contexts before flow proceeds to step S116. At step S116, the saturated flag is cleared before flow proceeds to step S122 where flow proceeds as described above.

Figure 10:
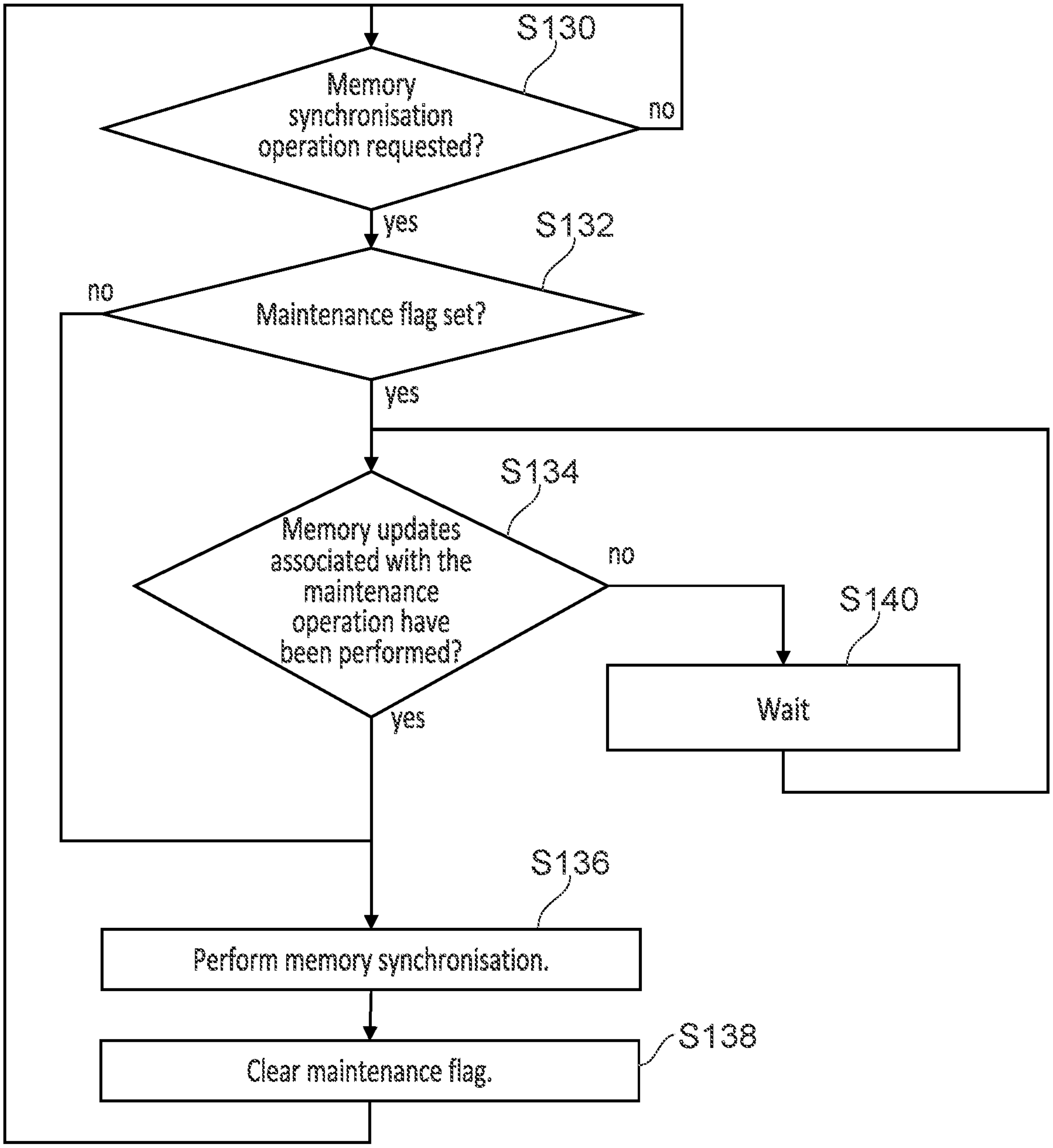
FIG. 10 schematically illustrates a sequence of steps carried out according to some configurations of the present techniques.

FIG. 10 schematically illustrates a sequence of steps carried out in response to receipt of a memory synchronisation request. Flow begins at step S130 where it is determined whether a memory synchronisation operation has been requested (received). If, at step S130, it is determined that a memory synchronisation operation has not been requested, then flow remains at step S130. If, at step S130, it is determined that a memory synchronisation operation has been requested, then flow proceeds to step S132 where it is determined if the maintenance flag is set. If, at step S132, it was determined that the maintenance flag is not set, then flow proceeds to step S136. If, at step S132, it is determined that the maintenance flag is set, then flow proceeds to step S134, where it is determined if memory updates associated with the maintenance operation have been performed. If, at step S134, it is determined that the memory updates have not all been performed, then flow proceeds to step S140, where a delay is implemented before flow returns to step S134. If, at step S134, it is determined that the memory updates associated with the maintenance operation have been performed then flow proceeds to step S136 where the memory synchronisation is performed. Flow then proceeds to step S138 where the maintenance flag is cleared before flow returns to step S130.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 11:
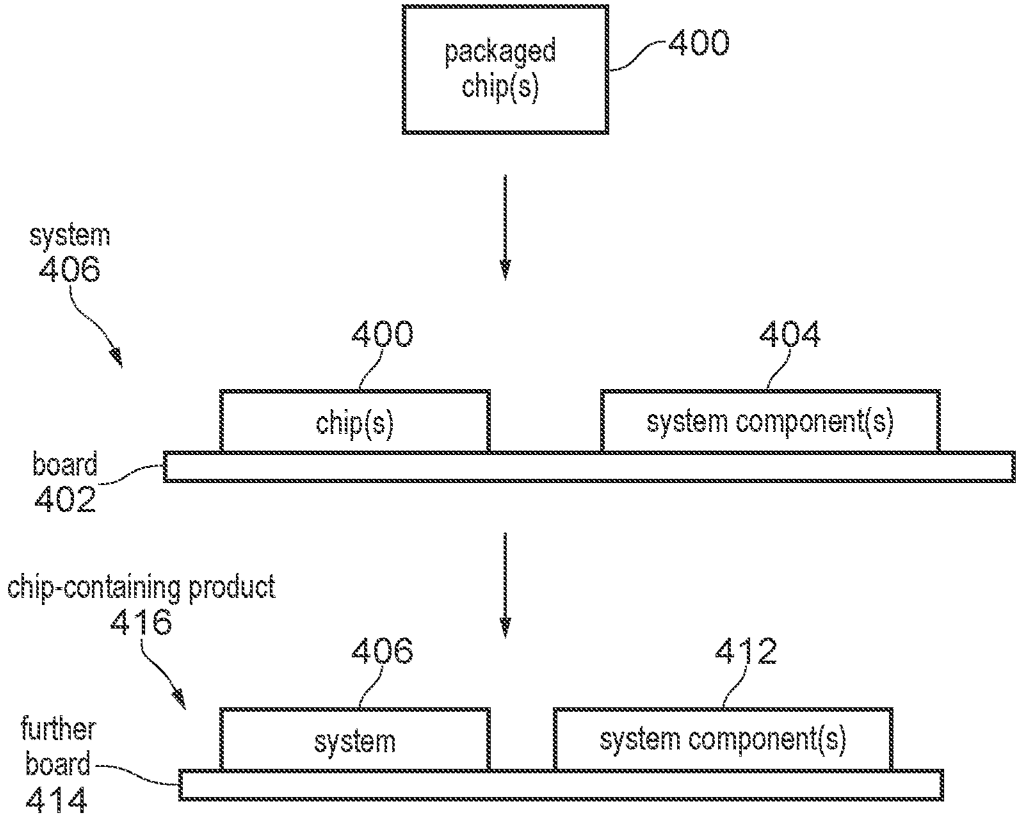
FIG. 11 schematically illustrates a system and chip-containing product according to some configurations of the present techniques.

As shown in FIG. 11, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, System Verilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In brief overall summary there is provided an apparatus, system, method, and medium. The apparatus comprises one or more processing elements, each processing element comprising processing circuitry to perform processing operations in one of a plurality of processing contexts. Each processing element further comprises context tracking circuitry to store context tracking data indicative of active contexts. Each processing element comprises control circuitry responsive to a request for a memory synchronisation occurring subsequent to at least one maintenance operation associated with a given set of one or more contexts of the plurality of processing contexts, to determine whether at least one of the given set of one or more contexts is indicated in the context tracking data. The control circuitry is configured, when the at least one of the given set of one or more contexts is determined to be indicated in the context tracking data, to implement a delay before performing the memory synchronisation, and when each of the given set of one or more contexts is determined to be absent from the context tracking data, to perform the memory synchronisation without implementing the delay.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Some configurations of the invention are set out in the following numbered clauses:

Clause 1. An apparatus comprising one or more processing elements, each processing element of the one or more processing elements comprising:
- processing circuitry configured to perform processing operations, wherein the processing operations are carried out in one of a plurality of processing contexts;
- context tracking circuitry configured to store context tracking data indicative of active contexts of the plurality of processing contexts in which the processing operations have been carried out by the processing circuitry; and
- control circuitry responsive to a request for a memory synchronisation occurring subsequent to at least one maintenance operation, the at least one maintenance operation associated with a given set of one or more contexts of the plurality of processing contexts, to determine whether at least one of the given set of one or more contexts is indicated in the context tracking data, and in response to the determination:
  - when the at least one of the given set of one or more contexts is determined to be indicated in the context tracking data, to implement a delay before performing the memory synchronisation, the delay continuing until one or more pending memory updates have been performed; and
  - when each of the given set of one or more contexts is determined to be absent from the context tracking data, to perform the memory synchronisation without implementing the delay.

Clause 2. The apparatus of clause 1, wherein each processing element comprises a translation lookaside buffer configured to store translations between a first address space associated with one of the plurality of processing contexts and a second address space, and the at least one maintenance operation comprises a translation lookaside buffer maintenance operation.

Clause 3. The apparatus of clause 1 or clause 2, wherein the context tracking data comprises a set of context identifiers.

Clause 4. The apparatus of clause 1 or clause 2, wherein:
- the context tracking data is stored as a filtered data set generated by applying a filter to context identifiers associated with each of the active contexts; and
- the control circuitry is configured to determine whether at least one of the given set of one or more contexts is included in the filtered data set by applying the filter to the given set of one or more contexts to generate a corresponding filtered context identifier, and comparing the corresponding filtered context identifier to the context tracking data.

Clause 5. The apparatus of clause 4, wherein the context tracking data comprises a single bit vector generated as a logical OR of each filtered context identifier associated with the active contexts.

Clause 6. The apparatus of clause 4 or clause 5, wherein the filter circuitry implements a bloom filter.

Clause 7. The apparatus of any preceding clause, wherein:
- the apparatus is configured to provide a virtualized operating environment supporting a plurality of virtual machines each associated with a virtual machine identifier; and
- each virtual machine of the virtual machines corresponds to one or more of the plurality of processing contexts identified by the virtual machine identifier associated with that virtual machine.

Clause 8. The apparatus of clause 7, wherein at least one of the virtual machines is configured to implement a distributed virtual memory and the memory synchronisation is a distributed virtual memory synchronisation.

Clause 9. The apparatus of clause 7 or clause 8, wherein the context tracking data comprises, for each active context of the active contexts, information indicative of at least one of:
- a virtual machine identifier associated with the active context;
- a security state associated with the active context; and
- an exception level associated with the active context.

Clause 10. The apparatus of any preceding clause, wherein the control circuitry is responsive to the context tracking data meeting a predetermined condition to perform a tracking data reset procedure comprising clearing the context tracking data.

Clause 11. The apparatus of clause 10, wherein the context tracking circuitry comprises storage space for a first number of context identifiers and the predetermined condition is met when storage of a new context identifier in the context tracking circuitry would exceed the storage space.

Clause 12. The apparatus of clause 10, wherein:
- the context tracking data is stored as a filtered data set;
- the control circuitry is configured to calculate a likelihood that the determination could result in a false positive; and
- the predetermined condition is met when the likelihood exceeds a predetermined threshold.

Clause 13. The apparatus of any of clauses 10 to 12, wherein:
- the tracking data reset procedure comprises setting a saturation flag to indicate that the context tracking data has been cleared; and
- the control circuitry is responsive to the at least one maintenance operation, when the saturation flag indicates that the context tracking data has been cleared, to convert the at least one maintenance operation associated with the given set of one or more contexts to at least one maintenance operation associated with each of the plurality of processing contexts and to clear the saturation flag.

Clause 14. The apparatus of any preceding clause, wherein:
- the control circuitry is responsive to receipt of the at least one maintenance operation subsequent to an earlier memory synchronisation request and when at least one of the given set of one or more contexts is indicated in the context tracking data, to set a maintenance flag;
- the control circuitry is configured, when responding to the request for the memory synchronisation, to determine whether the at least one of the given set of one or more contexts is indicated in the context tracking data based on a value of the maintenance flag; and the control circuitry is responsive to completion of the memory synchronisation, to clear the maintenance flag.

Clause 15. The apparatus of clause 14 when dependent on clause 13, wherein the control circuitry is responsive to receipt of the request for the at least one maintenance operation, when the saturation flag indicates that the context tracking data has been cleared, to set the maintenance flag independent of whether any of the given set of one or more contexts are indicated in the context tracking data.

Clause 16. The apparatus of any preceding clause, wherein at least one of the given set of one or more contexts is different from a current context being processed by the processing circuitry.

Clause 17. The apparatus of any preceding clause, wherein the control circuitry is configured to implement the delay until all pending memory updates have been performed.

Clause 18. The apparatus of any of clauses 1 to 16, wherein the control circuitry is configured to implement the delay until pending memory updates associated with the at least one maintenance operation have been performed.

Clause 19. A system comprising:

the apparatus of any preceding clause, implemented in at least one packaged chip;

at least one system component; and a board, wherein the at least one packaged chip and the at least one system component are assembled on the board.

Clause 20. A chip-containing product comprising the system of clause 19 assembled on a further board with at least one other product component.

Clause 21. A non-transitory computer readable storage medium to store computer-readable code for fabrication of the apparatus according to any of clauses 1 to 18.

I claim:

1. An apparatus comprising one or more processing elements, each processing element of the one or more processing elements comprising:

processing circuitry configured to perform processing operations, wherein the processing operations are carried out in one of a plurality of processing contexts;

context tracking circuitry configured to store context tracking data indicative of active contexts of the plurality of processing contexts in which the processing operations have been carried out by the processing circuitry; and control circuitry responsive to a request for a memory synchronisation occurring subsequent to at least one maintenance operation, the at least one maintenance operation associated with a given set of one or more contexts of the plurality of processing contexts, to determine whether at least one of the given set of one or more contexts is indicated in the context tracking data, and in response to the determination:

when the at least one of the given set of one or more contexts is determined to be indicated in the context tracking data, to implement a delay before performing the memory synchronisation, the delay continuing until one or more pending memory updates have been performed; and when each of the given set of one or more contexts is determined to be absent from the context tracking data, to perform the memory synchronisation without implementing the delay.

2. The apparatus of claim 1, wherein each processing element comprises a translation lookaside buffer configured to store translations between a first address space associated with one of the plurality of processing contexts and a second address space, and the at least one maintenance operation comprises a translation lookaside buffer maintenance operation.

3. The apparatus of claim 1, wherein the context tracking data comprises a set of context identifiers.

4. The apparatus of claim 1, wherein:

the context tracking data is stored as a filtered data set generated by applying a filter to context identifiers associated with each of the active contexts; and the control circuitry is configured to determine whether at least one of the given set of one or more contexts is included in the filtered data set by applying the filter to the given set of one or more contexts to generate a corresponding filtered context identifier, and comparing the corresponding filtered context identifier to the context tracking data.

5. The apparatus of claim 4, wherein the context tracking data comprises a single bit vector generated as a logical OR of each filtered context identifier associated with the active contexts.

6. The apparatus of claim 4, wherein the filter circuitry implements a bloom filter.

7. The apparatus of claim 1, wherein:

the apparatus is configured to provide a virtualized operating environment supporting a plurality of virtual machines each associated with a virtual machine identifier; and each virtual machine of the plurality of virtual machines corresponds to one or more of the plurality of processing contexts identified by the virtual machine identifier associated with that virtual machine.

8. The apparatus of claim 7, wherein at least one of the plurality of virtual machines is configured to implement a distributed virtual memory and the memory synchronisation is a distributed virtual memory synchronisation.

9. The apparatus of claim 7, wherein the context tracking data comprises, for each active context of the active contexts, information indicative of at least one of:

a virtual machine identifier associated with the active context;

a security state associated with the active context; and an exception level associated with the active context.

10. The apparatus of claim 1, wherein the control circuitry is responsive to the context tracking data meeting a predetermined condition to perform a tracking data reset procedure comprising clearing the context tracking data.

11. The apparatus of claim 10, wherein the context tracking circuitry comprises storage space for a first number of context identifiers and the predetermined condition is met when storage of a new context identifier in the context tracking circuitry would exceed the storage space.

12. The apparatus of claim 10, wherein:

the context tracking data is stored as a filtered data set;

the control circuitry is configured to calculate a likelihood that the determination as to whether at least one of the given set of one or more contexts is indicated in the context tracking data could result in a false positive; and the predetermined condition is met when the likelihood exceeds a predetermined threshold.

13. The apparatus of claim 10, wherein:

the tracking data reset procedure comprises setting a saturation flag to indicate that the context tracking data has been cleared; and the control circuitry is responsive to the at least one maintenance operation, when the saturation flag indicates that the context tracking data has been cleared, to convert the at least one maintenance operation associated with the given set of one or more contexts to at least one maintenance operation associated with each of the plurality of processing contexts and to clear the saturation flag.

14. The apparatus of claim 13, wherein:

the control circuitry is responsive to receipt of the at least one maintenance operation subsequent to an earlier memory synchronisation request and when at least one of the given set of one or more contexts is indicated in the context tracking data, to set a maintenance flag;

the control circuitry is configured, when responding to the request for the memory synchronisation, to determine whether the at least one of the given set of one or more contexts is indicated in the context tracking data based on a value of the maintenance flag;

the control circuitry is responsive to completion of the memory synchronisation, to clear the maintenance flag; and the control circuitry is responsive to receipt of the request for the at least one maintenance operation, when the saturation flag indicates that the context tracking data has been cleared, to set the maintenance flag independent of whether any of the given set of one or more contexts are indicated in the context tracking data.

15. The apparatus of claim 1, wherein:

the control circuitry is responsive to receipt of the at least one maintenance operation subsequent to an earlier memory synchronisation request and when at least one of the given set of one or more contexts is indicated in the context tracking data, to set a maintenance flag;

the control circuitry is configured, when responding to the request for the memory synchronisation, to determine whether the at least one of the given set of one or more contexts is indicated in the context tracking data based on a value of the maintenance flag; and the control circuitry is responsive to completion of the memory synchronisation, to clear the maintenance flag.

16. The apparatus of claim 1, wherein at least one of the given set of one or more contexts is different from a current context being processed by the processing circuitry.

17. A system comprising:

the apparatus of claim 1, implemented in at least one packaged chip;

at least one system component; and a board, wherein the at least one packaged chip and the at least one system component are assembled on the board.

18. A chip-containing product comprising the system of claim 17 assembled on a further board with at least one other product component.

19. A method of operating an apparatus comprising one or more processing elements, the method comprising with the one or more processing elements:

performing, with processing circuitry, processing operations, wherein the processing operations are carried out in one of a plurality of processing contexts;

storing context tracking data indicative of active contexts of the plurality of processing contexts in which the processing operations have been carried out by the processing circuitry; and in response to a request for a memory synchronisation occurring subsequent to at least one maintenance operation, the at least one maintenance operation associated with a given set of one or more contexts of the plurality of processing contexts, determining whether the at least one of the given set of one or more contexts is indicated in the context tracking data, and in response to the determination:

when the at least one of the given set of one or more contexts is determined to be indicated in the context tracking data, implementing a delay before performing the memory synchronisation, the delay continuing until one or more pending memory updates have been performed; and when each of the given set of one or more contexts is determined to be absent from the context tracking data, performing the memory synchronisation without implementing the delay.

20. A non-transitory computer readable storage medium to store computer-readable code for fabrication of an apparatus comprising one or more processing elements, each processing element of the one or more processing elements comprising:

processing circuitry configured to perform processing operations, wherein the processing operations are carried out in one of a plurality of processing contexts;

context tracking circuitry configured to store context tracking data indicative of active contexts of the plurality of processing contexts in which the processing operations have been carried out by the processing circuitry; and control circuitry responsive to a request for a memory synchronisation occurring subsequent to at least one maintenance operation, the at least one maintenance operation associated with a given set of one or more contexts of the plurality of processing contexts, to determine whether at least one of the given set of one or more contexts is indicated in the context tracking data, and in response to the determination:

when the at least one of the given set of one or more contexts is determined to be indicated in the context tracking data, to implement a delay before performing the memory synchronisation, the delay continuing until one or more pending memory updates have been performed; and when each of the given set of one or more contexts is determined to be absent from the context tracking data, to perform the memory synchronisation without implementing the delay.

* * * * *